UNITED STATES PATENT OFFICE 2,041,265

ACYLATED POLYPEPTIDES

Ludwig Orthner, Leverkusen-I. G. Werk, and Georg Meyer, Cologne-Mulheim, Germany, assignors to I. G. Farbenindustrie Aktiengesellschaft, Frankfort-on-the-Main, Germany No Drawing. Application March 24, 1934, Serial No. 717,286. In Germany March 24, 1933

13 Claims. (Cl. 260—9)

The present invention relates to the manufacture of valuable auxiliary agents for the textile, leather and like industries.

We have found that valuable products can be obtained by acylating lower polypeptides containing from 1 to 5 peptide groups with the radicals of organic acids comprising carboxylic acids, organic sulfonic acids, sulfaminic acids, and acid organic derivatives of carbonic acid.

As starting material for our process there can be used peptides prepared synthetically according to known methods. We prefer, however, to employ mixtures of peptides, such as can be obtained by hydrolizing proteins or substances containing those, for instance, waste materials, such as leather- or hide-cuttings or slaughterhouse wastes. Depending on the nature of the proteins employed and the duration of the hydrolysis the properties of the products obtained by the above described condensation are varying within certain limits.

According to our invention there are introduced into the free amino groups of said peptides the radicals of organic carboxylic, sulfonic or sulfaminic acids, or acid organic derivatives of carbonic acid, of which the following may be cited as examples: carboxylic acids, especially those aliphatic carboxylic acids containing a radical of at least 8 carbon atoms, as for example undecylenic, lauric, palmitic, stearic, oleic, ricinoleic acid, mixtures of fatty acids obtainable from coco-nut oil, palm-nut oil, soya-bean oil, cotton-seed oil, linseed oil, rape-seed oil, wood oil, train oil, etc., mixtures of fatty acids obtainable by oxidation of hydrocarbons, for instance, paraffin, remains of the manufacture of fats, oils and fatty acids thereof, the products obtainable by hydrogenation of the above mentioned unsaturated fatty acids and their mixtures, furthermore naphthenic acids, resin acids, for instance those of tall oil and of natural or hydrogenated colophonium, aromatic, cycloaliphatic and hydroaromatic carboxylic acids, as for instance, naphthoic acid and oxynaphthoic acid, tetrahydronaphthalene carboxylic acid etc., acid esters of carbonic acid, for instance, the esters of aliphatic saturated or unsaturated alcohols (ethyl, butyl, octyl, dodecyl, myristyl, cetyl, octodecyl, oleyl alcohol, octodecandiol, montanol), of cycloaliphatic, hydroaromatic, aromatic and aliphatic-aromatic alcohols, for instance, cyclohexanol, methylcyclohexanol, benzyl alcohol, cinnamic alcohol, phenylcetyl alcohol, or of a mixture of alcohols, such as can be prepared by hydrogenation of oils, fats, and waxes, further substituted carbamic acids, for instance, dodecylmethyl carbamic acid, dicyclohexyl carbamic acid, methylheptadecyl carbamic acid. Sulfonic acids which can be used according to our invention are, for example, butyl sulfonic acid, higher saturated, unsaturated or halogenated aliphatic sulfonic acids, dichlorobenzyl sulfonic acid, diisobutylnaphthalene sulfonic acid, chlorinated naphthalene sulfonic acids, xylol sulfonic acids, substituted sulfaminic acids, for instance, dodecylmethyl sulfaminic acid etc.

The condensation of said acids with the peptides mentioned above is performed in the usual manner, if desired in the presence of organic solvents, as for example, alcohols or hydrocarbons. Instead of using the free acids we prefer to employ their reactive derivatives, more especially the acid chlorides derived therefrom. In case chlorides are used it is preferable to carry out the reaction in the presence of indifferent acid-binding agents, for instance, pyridin, dialkylaniline etc., or in aqueous alkaline solution.

In order to ensure quantitative reaction of the said acids or their derivatives an excess of polypeptides is employed. Thereby we get the further advantage that the properties of the products are often very much improved if unaltered polypeptides are present in the reaction mixture.

The valuable properties of the products prepared according to our invention depend on the nature of the polypeptides employed and also on the kind of acid condensed therewith. In order to obtain products which are specifically suitable for a given purpose, it is necessary to select the most favorable kind of peptide or mixture of peptides and condense it with such an acid as will also best serve the said purpose.

The condensation products obtainable from technical peptides and mixtures thereof are in the form of their sodium salts friable or pasty, sometimes resinous and sticky, lightly colored substances, which are easily soluble in water to form foaming solutions.

The products prepared according to our invention can be used in various ways. They are very stable to calcium and magnesium salts and have a high dispersing capacity for insoluble calcium soaps, as well as valuable properties as washing, wetting, bucking, dispersing, emulsifying, levelling, sizing, softening and finishing agents. They can be used for the preparation of color pastes and solutions of colors, for making dyed textiles fast to rubbing, for stabilizing peroxide solutions etc.

The products according to our invention can further be advantageously used in combination with other wetting, cleansing, dispersing, equalizing, sizing, softening and finishing agents as, for instance, with fatty acids, soaps, turkey-red oils, alkylnaphthalene sulfonic acids, condensation products of higher carboxylic acids with oxy or aminoalkyl sulfonic acids, sulfonates of alcohols of the fatty series, glue, starch, soluble gums, mucilages, alcohols, ketones, hydrocarbons, halogenated hydrocarbons etc.

The following examples will further illustrate the nature of our said invention which, however, is not limited thereto.

*Example 1*

14 g. of glycylglycine are dissolved in 40 g. of a 10% sodium hydroxide solution. 22 g. of lauric acid chloride and 45 g. of a 10% sodium hydroxide solution are added thereto at a temperature which is preferably below 60° C. in such a manner that the reaction mixture is always alkaline. After the whole quantity of chloride has been consumed the reaction mixture is warmed for some time to 60–80° C. A foaming solution is obtained which is very resistant to calcium salts and has good wetting capacity.

By evaporation of the solvent the sodium salt of the product can be isolated as a resinous mass easily soluble in water.

*Example 2*

To a 40% solution of 400 g. of a technical mixture of peptides (obtained by heating finely divided leather cuttings with slaked lime in a stirring autoclave to 130° C. for 6 hours and afterwards treating the mixture with sodium carbonate) are added 175 g. of oleic acid chloride and 150 g. of a 20% sodium hydroxide solution whilst intensely stirring. The chloride is added in such a manner that the reaction mixture is always alkaline. If the whole amount of the oleic acid chloride has been consumed the reaction mixture is warmed for one hour to 60–70° C. The solution obtained thereby can be used as a wetting and washing preparation.

By evaporating a resinous substance is obtained which is easily soluble in water to form stable solutions.

*Example 3*

A 40% solution of 800 g. of a technical mixture of peptides (prepared by heating leather scraps with technical concentrated sodium hydroxide lye for 12 hours) is condensed according to the method described in Examples 1 and 2 with 400 g. of coco-nut fatty acid chloride or lauric acid chloride and an amount of concentrated sodium hydroxide lye (40° Bé.) sufficient for keeping the reaction mixture always alkaline. The mixture is warmed afterwards to 60–70° C. for 1 hour.

The reaction product is a very much foaming liquid of good stability to calcium salts and of high wetting capacity.

*Example 4*

A 40% solution of 800 g. a technical mixture of peptides (prepared by heating leather cuttings with water in an autoclave to 115° C. for 6 hours) is condensed with 400 g. of resin acid chloride (prepared by the method of Virtanen, Liebigs Annalen 424, page 209, from resin acid and phosphorous pentachloride) and concentrated sodium hydroxide lye according to the method described in Example 2. The product obtained in this way shows high dispersing capacity especially for producing foams. Instead of by treatment with superheated steam the decomposition of the protein can also be accomplished with the aid of acids or of alkaline solutions of alkali metal- or alkaline earth metal-compounds.

The optimal conditions of working (concerning the nature of the starting material, temperature, pressure, hydrogen ion concentration and time for the hydrolysis) once having been established, a certain composition of the mixture of peptides can be reproduced with sufficient accuracy.

*Example 5*

800 g. of the mixture of peptides prepared according to Example 2 are condensed in a 40% aqueous solution with 400 g. of naphthenic acid chloride (prepared from a mixture of liquid naphthenic acids with an acid number of about 200) and the necessary amount of concentrated sodium hydroxide lye at 30° C. as described in Example 2. In order to complete the reaction the mixture is then warmed to 60–70° C. for 1 hour. The resulting product can be used as a wetting, equalizing etc. agent.

*Example 6*

800 g. of a mixture of peptides (same as in Example 4) are condensed in a 40% aqueous solution with 400 g. of the chlorides of a mixture of acids which have been prepared by oxidizing paraffin with air at about 160° C. and then freeing it from neutral products. The resulting product is especially suitable for the use in mercerizing baths.

*Example 7*

To a 40% solution of 400 g. of a technical mixture of peptides (prepared by heating finely divided leather cuttings with 10% slaked lime and water in an autoclave to 130° C. for 6 hours and treating the reaction mixture with sodium carbonate) are added a solution of 330 g. of diisobutylnaphthalene sulfonic-acid chloride in 500 g. of acetone and 530 ccm. of a 2n-sodium hydroxide solution at 90° C. The condensation is effected in such a manner that the solution shows always slightly alkaline reaction. The acetone used as a solvent, which is evaporating during the process, is easily recovered. In order to complete the reaction the temperature is maintained at 90° C. for half an hour. The product can be used as a wetting and dispersing agent.

*Example 8*

400 g. of a technical mixture of peptides (same as in Example 4) are condensed with 250 g. of stearic acid chloride according to the method described in Example 2. The resulting product is suitable as a softening agent, especially in the treatment of artificial silk.

*Example 9*

100 g. of gelatin are heated with a solution of 15 g. of sodium hydroxide in 500 g. of water for 18–24 hours on the water bath. From time to time some water is added so as to keep the concentration of the solution constant. To the mixture of the polypeptides obtained in this manner 50 g. of cetyl chlorcarbonate are added during 1 hour at 45–50° C.; the solution is always kept alkaline during the process. In order to complete the reaction the mixture is afterwards warmed to 80–90° C. for 3 hours whilst stirring. A foaming solution of great viscosity is obtained. By evaporating till its water content is about 40% it yields a clear yellowish or brownish mass which is easily soluble in water. Its aqueous solution is stable to magnesium, calcium and barium salts and is especially suitable as an equalizing agent.

Example 10

To a solution of polypeptides (prepared from 200 g. of leather cuttings according to the method described in Example 2) 75 g. of the chlorcarbonates of a mixture of alcohols containing from 8 to 18 carbon atoms, which mixture can be prepared by catalytical reduction of coco-nut oil, are added at a temperature of about 45-50° C. during 1 hour. The reaction mixture is always kept alkaline by simultaneously adding sodium hydroxide solution. In order to complete the reaction the mixture is then warmed to 80-90° C. for 1 hour. A highly viscous paste is obtained which can be dissolved in water to form clear solutions possessing good wetting, washing, dispersing and equalizing properties.

A product of similar properties can be obtained by condensing the same mixture of peptides with the carbamic chloride prepared from phosgene and methyldodecylamine.

Example 11

100 g. of a 40% polypeptide solution (prepared according to Example 2) are condensed at 95° C. with 23 g. of α-naphthalene sulfonic acid, dissolved in 50 g. of acetone. A 2n-solution of sodium hydroxide is simultaneously added in such quantities as to maintain the reaction of the mixture always alkaline. The acetone is recovered by evaporating and condensing.

Aqueous solutions of the product obtained by the process described above are capable of hydrotropically dissolving insoluble substances. In this manner considerable quantities of butanol, cyclohexanol and like substances can be dissolved in aqueous mediums.

We claim:—

1. A mixture of polypeptides containing from 1 to 5 peptide groups, said peptides being acylated with organic acid radicals selected from the group consisting of carboxylic acid radicals containing at least 8 carbon atoms, sulfonic acid radicals, sulfaminic acid radicals, and the radicals of acid organic derivatives of carbonic acid.

2. A mixture of polypeptides containing from 1 to 5 peptide groups obtainable by hydrolyzing protein materials, said polypeptides being acylated with organic acid radicals selected from the group consisting of carboxylic acid radicals containing at least 8 carbon atoms, sulfonic acid radicals, sulfaminic acid radicals, and the radicals of acid organic derivatives of carbonic acid.

3. A mixture of polypeptides containing from 1 to 5 peptide groups obtainable by hydrolizing protein materials, said polypeptides being acylated with a carboxylic acid radical containing at least 8 carbon atoms.

4. A mixture of polypeptides containing from 1 to 5 peptide groups obtainable by hydrolyzing protein materials, said polypeptides being acylated with the radical of a higher aliphatic carboxylic acid.

5. A mixture of polypeptides containing from 1 to 5 peptide groups obtainable by hydrolyzing protein materials, said polypeptides being acylated with the radical of coco-nut oil acid.

6. A mixture of polypeptides containing from 1 to 5 peptide groups obtainable by hydrolyzing protein materials, said polypeptides being acylated with the radical of oleic acid.

7. A mixture of polypeptides containing from 1 to 5 peptide groups obtainable by hydrolyzing protein materials, said polypeptides being acylated with the radical of an organic sulfonic acid.

8. A mixture of polypeptides containing from 1 to 5 peptide groups obtainable by hydrolyzing protein materials, said polypeptides being acylated with the radical of diisobutylnaphthalene sulfonic acid.

9. A mixture of polypeptides containing from 1 to 5 peptide groups obtainible by hydrolyzing protein materials, said polypeptides being acylated with the radical of an acid organic derivative of carbonic acid of the formula RO—CO—OH, in which R means an aliphatic, cycloaliphatic, aromatic or hydroaromatic radical.

10. A mixture of polypetides containing from 1 to 5 peptide groups obtainable by hydrolyzing protein materials, said polypeptides being acylated with the radical of hydrogen cetyl carbonate (Cetyl—O—CO—OH).

11. The process which comprises condensing a mixture of polypeptides containing from 1 to 5 peptide groups with an organic oxygen containing compound selected from the group consisting of carboxylic acids containing at least 8 carbon atoms, sulfonic acids, sulfaminic acids, acid organic derivatives of carbonic acid and the halogenides, anhydrides and esters thereof.

12. The process which comprises condensing a mixture of lower polypeptides obtainable by hydrolyzing protein materials with the chlorides of higher fatty acids.

13. The process which comprises condensing a mixture of lower polypeptides obtainable by hydrolizing protein materials with chlorcarbonates of the formula Cl—CO—OR, wherein R is an aliphatic, cycloaliphatic, aromatic or hydroaromatic radical.

LUDWIG ORTHNER.
GEORG MEYER.